United States Patent
Izumi

(10) Patent No.: US 10,989,894 B2
(45) Date of Patent: Apr. 27, 2021

(54) LENS DRIVING APPARATUS, CONTROL METHOD THEREFOR, STORAGE MEDIUM STORING CONTROL PROGRAM THEREFOR, AND IMAGE PICKUP APPARATUS

(71) Applicant: CANON KABUSHIKI KAISHA, Tokyo (JP)

(72) Inventor: Mitsuhiro Izumi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 417 days.

(21) Appl. No.: 15/433,521

(22) Filed: Feb. 15, 2017

(65) Prior Publication Data

US 2017/0242216 A1    Aug. 24, 2017

(30) Foreign Application Priority Data

Feb. 22, 2016    (JP) .............................. JP2016-030844

(51) Int. Cl.
  *G02B 7/09*    (2021.01)
  *G02B 7/28*    (2021.01)
  *G02B 7/08*    (2021.01)

(52) U.S. Cl.
  CPC .................. *G02B 7/09* (2013.01); *G02B 7/28* (2013.01); *G02B 7/08* (2013.01)

(58) Field of Classification Search
  CPC ............... G02B 7/09; G02B 7/08; G02B 7/28
  USPC ......................................................... 359/824
  See application file for complete search history.

(56) References Cited

U.S. PATENT DOCUMENTS

| | | | | |
|---|---|---|---|---|
| 4,774,538 A | * | 9/1988 | Kawai | ..................... G02B 7/282 |
| | | | | 348/E5.046 |
| 2015/0029387 A1 | * | 1/2015 | Kawai | ................ H04N 5/23212 |
| | | | | 348/347 |

FOREIGN PATENT DOCUMENTS

| | | |
|---|---|---|
| JP | 05-066336 A | 3/1993 |
| JP | 2004-101946 A | 4/2004 |

OTHER PUBLICATIONS

The above foreign patent document was cited in the Jan. 28, 2020 Japanese Office Action, which is inclosed without an English Translation, that issued in Japanese Patent Application No. 2016030844.

* cited by examiner

*Primary Examiner* — Marin Pichler
*Assistant Examiner* — Mitchell T Oestreich
(74) *Attorney, Agent, or Firm* — Cowan, Liebowitz & Latman, P.C.

(57) ABSTRACT

A lens driving apparatus that enables to improve responsiveness. The lens driving apparatus drives a lens in an optical axis direction. A holding member holds the lens and is movable in the optical axis direction. A first detection unit detects a position of the holding member in the optical axis direction as a current position. A second detection unit detects information about deformation of the holding member. A control unit controls movement of the holding member based on the current position and the information about deformation.

9 Claims, 11 Drawing Sheets

LENS DRIVING APPARATUS, CONTROL METHOD THEREFOR, STORAGE MEDIUM STORING CONTROL PROGRAM THEREFOR, AND IMAGE PICKUP APPARATUS

BACKGROUND OF THE INVENTION

Field of the Invention

The present invention relates to a lens driving apparatus, a control method therefor, a storage medium storing a control program therefor, and an image pickup apparatus, and in particular, relates to driving control for the lens driving apparatus.

Description of the Related Art

In recent years, there are many using methods of an image pickup apparatus, such as a digital camera, and various photographing styles that are suitable to photographing in various photographing scenes are proposed. Accordingly, there is a known image pickup apparatus that is provided with an auto-focusing mechanism with high responsiveness in order to follow an object that moves in high speed (see Japanese Laid-Open Patent Publication (Kokai) No. H5-66336 (JP H5-66336A)).

Incidentally, an object and an image pickup apparatus move variously at the time of photographing. Then, since a motion of the image pickup apparatus becomes large when an object of which an orientation varies frequently is photographed, high responsiveness is required for a lens driving apparatus. In order to improve the responsiveness, it is necessary to reduce weight of a moving part, such as an auto-focusing mechanism, in the lens driving apparatus.

However, the weight reduction may lower rigidity and may cause vibration in the moving part at a time of stopping. This lengthens settling time of the moving part and lowers the responsiveness as a result.

SUMMARY OF THE INVENTION

The present invention provides a lens driving apparatus, a control method therefor, a storage medium storing a control program therefor, which enables to improve responsiveness.

Accordingly, a first aspect of the present invention provides a lens driving apparatus that drives a lens in an optical axis direction, the lens driving apparatus including a holding member that holds the lens and is movable in the optical axis direction, a first detection unit configured to detect a position of the holding member in the optical axis direction as a current position, a second detection unit configured to detect information about deformation of the holding member, and a control unit configured to control movement of the holding member based on the current position and the information about deformation.

Accordingly, a second aspect of the present invention provides an image pickup apparatus including a photographing optical system that includes a focusing lens, and the lens driving apparatus of the first aspect.

Accordingly, a third aspect of the present invention provides a control method for a lens driving apparatus having a holding member that holds a lens and is movable in an optical axis direction, the control method including a first detection step of detecting a position of the holding member in the optical axis direction as a current position, a second detection step of detecting information about deformation of the holding member, and a control step of controlling movement of the holding member based on the current position and the information about deformation.

Accordingly, a fourth aspect of the present invention provides a non-transitory computer-readable storage medium storing a control program causing a computer to execute the control method of the third aspect.

According to the present invention, the responsiveness at the time of drivingly controlling the lens will be improved.

Further features of the present invention will become apparent from the following description of exemplary embodiments with reference to the attached drawings.

BRIEF DESCRIPTION OF THE DRAWINGS

FIG. 14A shows a state where the lens is not inclining. FIG. 14B shows a state where the lens is inclining.

DESCRIPTION OF THE EMBODIMENTS

Hereafter, an example of a lens driving apparatus according to an embodiment of the present invention will be described with reference to the attached drawings.

Figure 1:
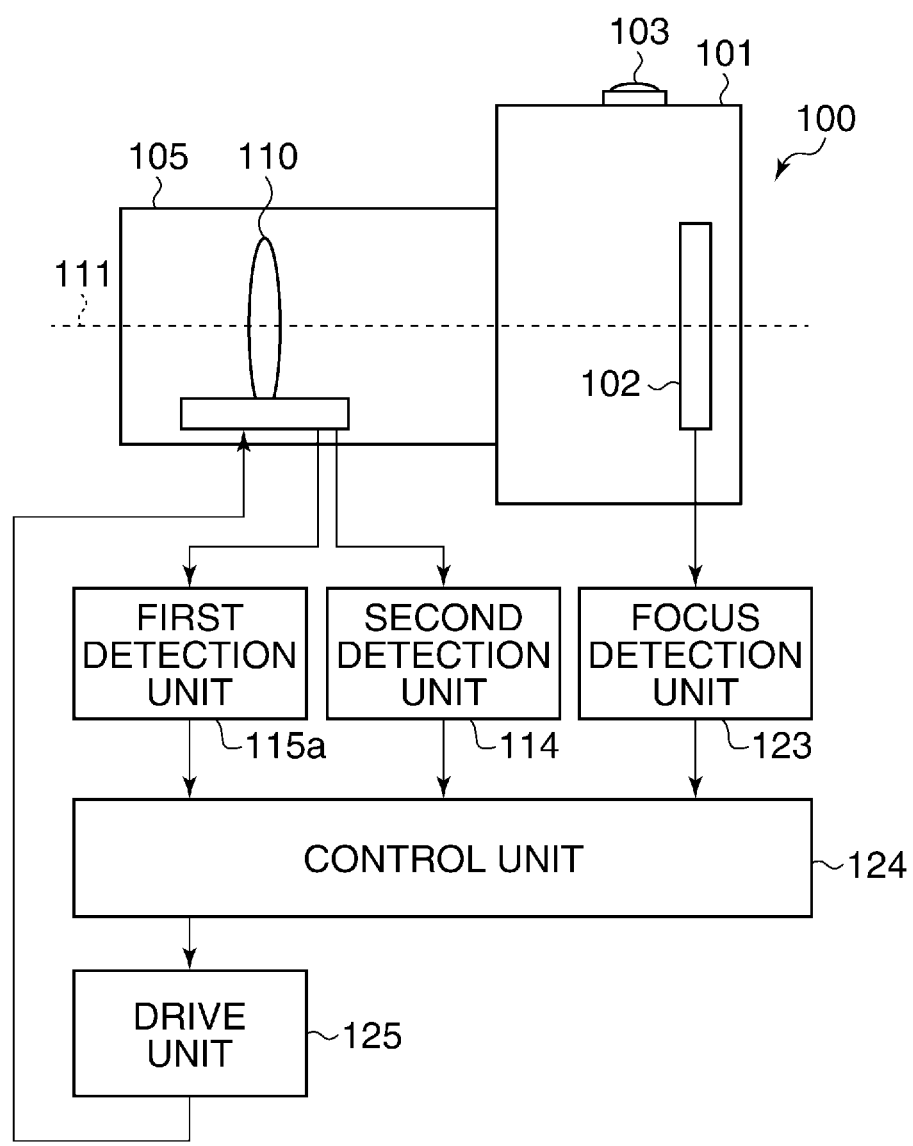
FIG. 1 is a block diagram schematically showing a configuration of an example of an image pickup apparatus (a camera) equipped with a lens driving apparatus according to a first embodiment of the present invention.

FIG. 1 is a block diagram schematically showing a configuration of an example of an image pickup apparatus (a camera) equipped with a lens driving apparatus according to a first embodiment of the present invention.

The image pickup apparatus shown in FIG. 1 is a digital camera (hereinafter referred to as a camera, simply), for example. The camera 100 has a camera body 101 and a lens barrel 105. The camera body 101 is provided with an image pickup unit 102, and an optical image is formed on the image pickup unit 102 through an optical system in the lens barrel 105. Then, the image pickup unit 102 generates image data corresponding to the optical image.

The image pickup unit 102 is provided with an image pickup device that has a plurality of pixels. A focus detection unit 123 detects a distance to an object as an object distance on the basis of parallax corresponding to an image pick-up result (image data) obtained with the image pickup device (i.e., focus is detected). Then, a control unit 124 drivingly controls a lens driving mechanism 110 on the basis of the object distance obtained by the focus detection unit 123 as mentioned later.

An operation part (for example, a release button) 103 is provided in the camera body 101. When the operation part 103 is half-pressed, the control unit 124 detects focus by the focus detection unit 123. Then, the control unit 124 controls a drive unit 125 provided with a driver IC etc. according to the focus detection result, and adjusts the focus of the optical image (object image) formed on the image pickup unit 102 by driving the lens driving mechanism 110.

When the operation part 103 is full-pressed, the control unit 124 will start photographing. When photographing a static image, the control unit 124 drives a shutter (not shown) and obtains a still image from the image pickup unit 102. When capturing a video image, the control unit 124 repeats image pickup by the image pickup unit 102 while opening the shutter. As a result of this, a video image is obtained. It should be noted that an AF mode in which a predetermined object is always focused is used when a video image is captured. The image data obtained by the image pickup unit 102 is saved into a storage media (not shown), such as a memory card, after a predetermined process is applied by an image processing circuit (not shown). It should be noted that the operation part 103 may be a touch sensor etc. instead of a button.

The lens driving mechanism 110 is provided with a first detection unit 115a and second detection unit 114. Then, the detection results (mentioned later) by the first detection unit 115a and the second detection unit 114 are sent to the control unit 124. In response to these detection results, the control unit 124 controls the drive unit 125 to drive the lens driving mechanism 110 so as to control the position of a lens.

Figure 2A:
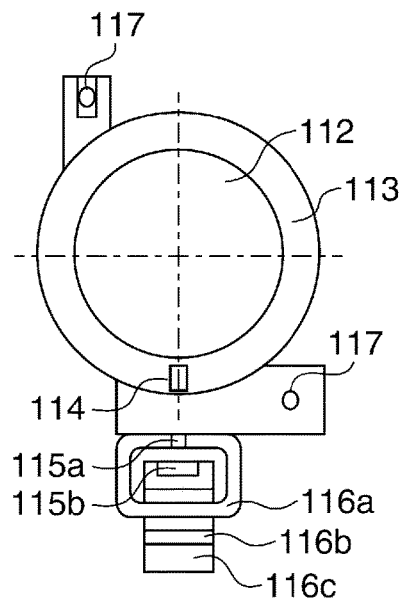
FIG. 2A and FIG. 2B are a front view and a side view of the lens driving apparatus shown in FIG. 1, respectively.
Figure 2B:
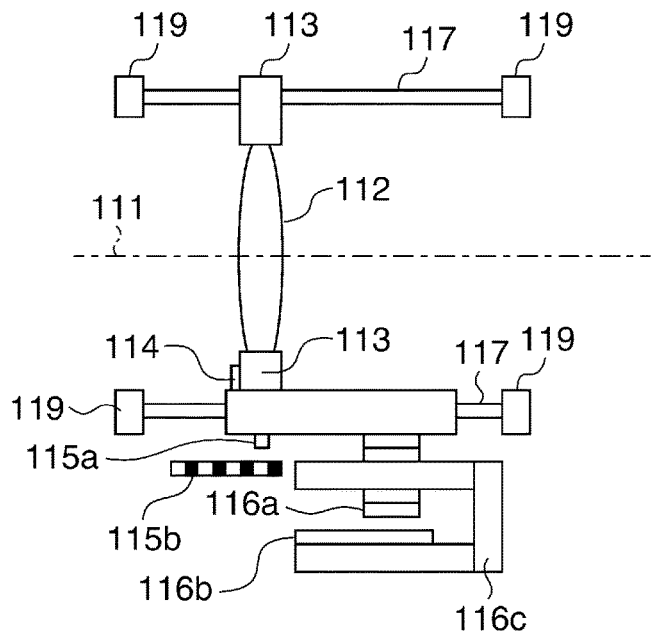

FIG. 2A and FIG. 2B are a front view and a side view of the lens driving apparatus shown in FIG. 1, respectively.

The lens barrel 105 is provided with a plurality of photographic lens groups (not shown) arranged along an optical axis 111 (see FIG. 2B) that is a center axis. The lens driving mechanism 110 has a lens (focusing lens) 112 for adjusting focus. When the lens 112 moves along the optical axis 111 with respect to the lens barrel 105 that is a fixing part, a focusing state (i.e., focus) on the image pickup unit 102 varies.

The lens 112 is held by a lens holding frame (holding member) 113. The lens holding frame 113 is supported movably along a guide part (guide rod) 117 fixed to the lens barrel 105 so as to be parallel to the optical axis 111. When an electric current is supplied to a coil 116a arranged on the lens holding frame 113, a thrust occurs along the optical axis 111 by an electromagnetism function between a magnet 116b fixed to the lens barrel 105 through a yoke 116c and the coil 116a. Then, the thrust concerned moves the lens 112 along the optical axis 111.

In the description, the coil 116a, magnet 116b, and yoke 116c constitute a driving source. Although a voice coil motor (VCM) using the coil and magnet is used as the driving source in the illustrated example, a combination of a stepping motor and lead screw may be used as the driving source. In addition, the driving source other than the VCM may be used as long as the driving source generates force of driving the lens 112 along the optical axis 111.

The first detection unit 115a for detecting the position of the lens holding frame 113 in the direction of the optical axis 111 is installed in the lens holding frame 113. A scale 115b that repeats bright and dark patterns is fixed to the lens barrel 105. The first detection unit 115a reads the pattern of the scale 115b optically, and detects the position of the lens holding frame 113. Although the illustrated example uses the optical sensor as the first detection unit 115a, a magnetic sensor or a mechanical sensor may be used. That is, the first detection unit 115a only needs to detect the position of the lens holding frame 113 in the direction of the optical axis 111.

The second detection unit 114 detects information about deformation of the lens holding frame 113. The second detection unit 114 is installed between the lens 112 and the first detection unit 115a on the lens holding frame 113. As a result of this, the second detection unit 114 detects change of the positional relationship between the first detection unit 115a and the lens 112 in the optical axis direction due to deformation of the lens holding frame 113 with sufficient sensitivity.

A strain gauge is used as the second detection unit 114 in the illustrated example. Then, the second detection unit 114 detects the information about deformation of the lens holding frame 113 in response to the strain in the surface of the lens holding frame 113. Since the second detection unit 114 only needs to detect the information about deformation of the lens holding frame 113, a piezoelectric device that converts force applying to piezoelectric material into voltage or an optical detection means such as a laser interferometer may be used as the second detection unit 114.

Figure 3:
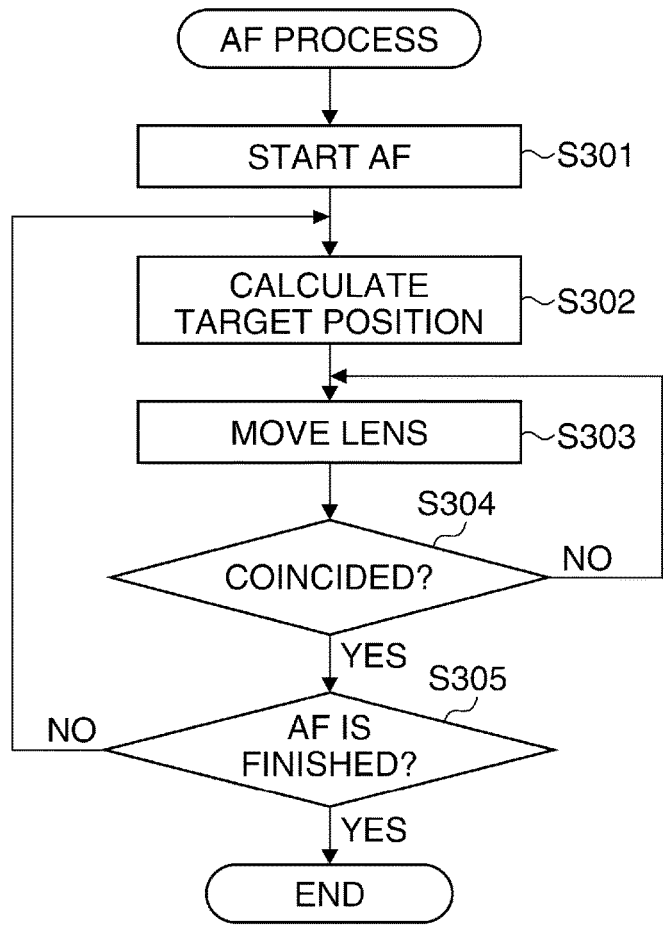
FIG. 3 is a flowchart for describing an example of an AF (autofocus) process performed in the camera shown in FIG. 1.

FIG. 3 is a flowchart for describing an example of an AF (autofocus) process performed in the camera shown in FIG. 1.

First, start of AF (autofocus) is instructed to the control unit 124 (step S301). In a case of photographing a static image, the control unit 124 starts the AF, when the button 103 is half-pressed. In the case of capturing a video image, the control unit 124 starts the AF, when the capturing starts. It should be noted that the control unit 124 may start the AF while recognizing an object when the power turns ON and an image is displayed on a display unit (not shown).

Subsequently, the control unit 124 calculates the position of the lens 112 at which an in-focus state is obtained as a target position according to the focus detection result that is an output of the focus detection unit 123 (step S302). Then, the control unit 124 moves the lens 112 along the optical axis according to the target position and the current position of the lens 112 obtained by the first detection unit 115a (step S303). Although the movement of the lens 112 will be mentioned later, the control unit 124 controls the driving source with using not only the detection result by the first detection unit 115 but also the detection result by the second detection unit 114.

Next, the control unit 124 determines whether the current position coincided with the target position by comparing the target position and the current position (step S304). When they did not coincide (NO in the step S304), the control unit 124 returns the process to the step S303. On the other hand, when they coincided (YES in the step S304), the control unit 124 determines whether the AF is finished (step S305).

When determining that the AF is finished (YES in the step S305), the control unit 124 finishes the AF process. On the other hand, when determining that the AF is not finished (NO in the step S305), the control unit 124 returns the process to the step S302, and obtains the target position of the lens 112. It should be noted that the control unit 124 determines that the AF is finished when the press of the button 103 stops and the button 103 is released, for example. Furthermore, when the button 103 is full-pressed, the control unit 124 determines that the AF is finished. Moreover, when capturing a video image, the control unit 124 temporarily stops the AF according to a user's instruction.

Figure 4:
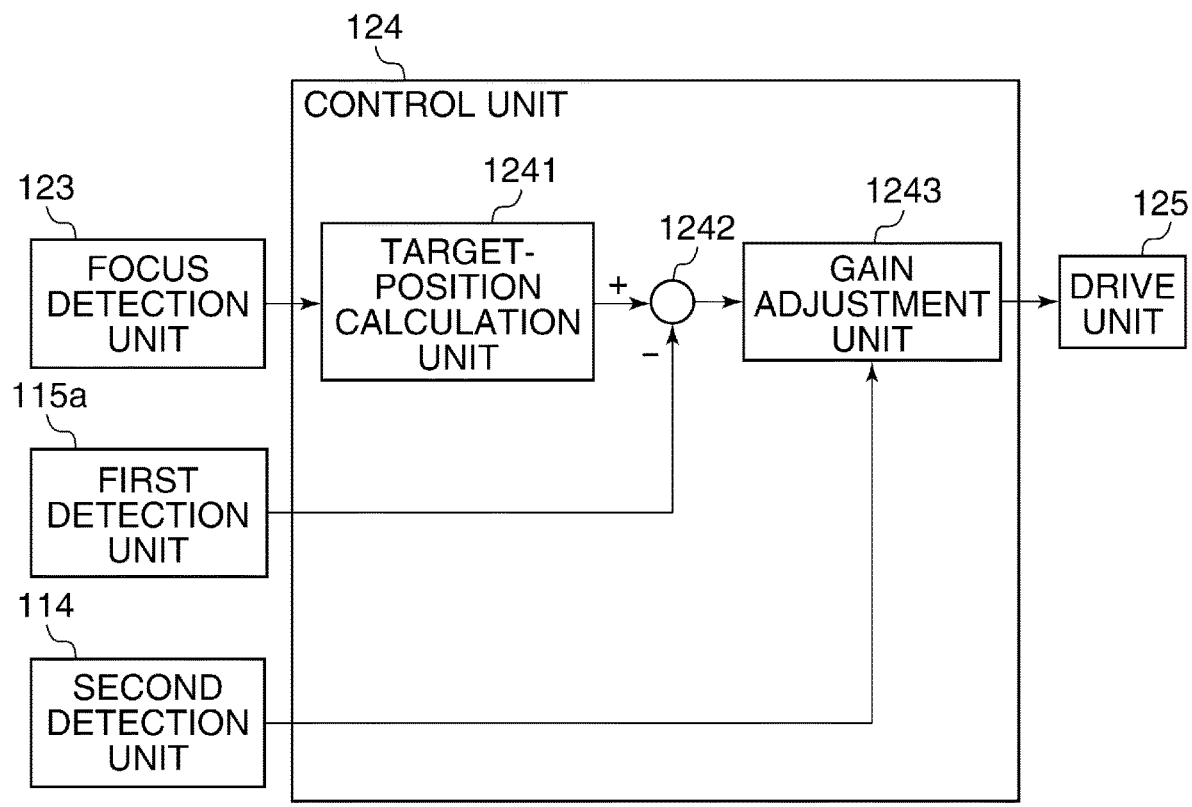
FIG. 4 is a block diagram showing an example of a functional block at the time of performing an AF process in the control unit shown in FIG. 1.

FIG. 4 is a block diagram showing an example of a functional block at the time of performing the AF process in the control unit shown in FIG. 1.

When receiving the focus detection result that is an output of the focus detection unit 123, a target-position calculation unit 1241 finds the target position (in-focus position) of the lens 112 according to the focus detection result. A subtractor 1242 outputs a position difference by subtracting the current position that is the detection result of the first detection unit 115a from the target position. A gain adjustment unit 1243 generates a driving signal showing a control amount by multiplying a predetermined control gain to the position difference. On the other hand, the deformation amount that is shown by the detection result of the second detection unit 114 is given to the gain adjustment unit 1243. Then, the gain adjustment unit 1243 adjusts the control gain according to the deformation amount concerned as mentioned later when the driving signal is generated.

Thus, the control unit 124 calculates a corrected drive amount by correcting the drive amount obtained on the basis of the difference according to the deformation amount, and controls the movement of the lens holding frame according to the corrected drive amount concerned.

Figure 5:
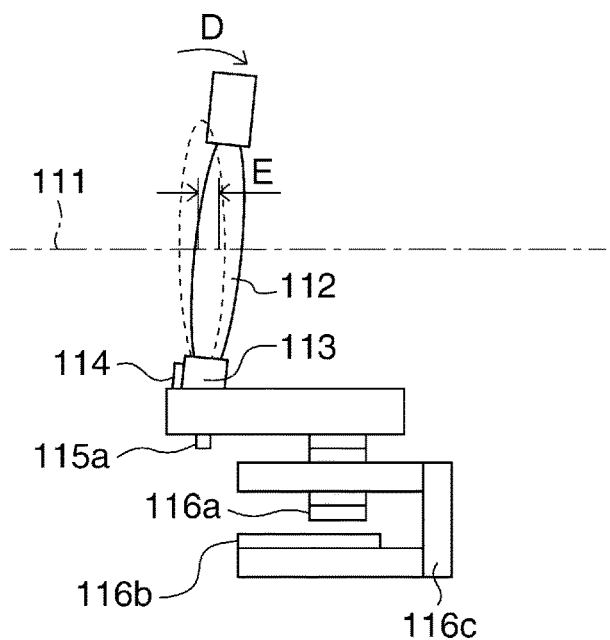
FIG. 5 is a side view of the lens driving apparatus for describing deformation detected by a second detection unit shown in FIG. 1.

FIG. 5 is a side view of the lens driving apparatus for describing deformation detected by the second detection unit shown in FIG. 1.

A part of the configuration of the lens driving mechanism 110 is omitted in FIG. 5. When the drive unit 116 drives the lens holding frame 113 along the optical axis 111, the lens holding frame 113 may deform by inertia force due to the mass of the lens 112. Furthermore, the lens holding frame 113 may vibrate by the natural vibration of the lens holding frame 113. These deformation and vibration become remarkable when the weight of the lens holding frame 113 etc. is saved in order to improve the responsiveness of an AF operation.

For example, when the lens holding frame 113 deforms as shown by an arrow D, the center position of the lens 112 shifts by a deviation amount E in the direction of the optical axis 111. That is, the current position of the lens 112 that is detected by the first detection unit 115a may differ from the center of the lens 112 by the deviation amount E in the direction of the optical axis 111. Since the deformation and vibration by the force in the moving direction cause this deviation amount E temporarily, the deviation amount will approach zero when sufficient time elapses. However, when vibration occurs, it takes time until convergence of the vibration concerned, which impairs the responsiveness of the lens movement.

Accordingly, the second detection unit 114 is installed between the first detection unit 115a and the lens 112 as mentioned above in the first embodiment. Since the second detection unit 114 is located at a root of the deformation part, the deformed state of the lens holding frame 113 is detected by measuring strain of the surface of the lens holding frame 113. Since the deviation amount E increases as the deformation becomes large in general, the deviation amount E is reduced by controlling so that the deformation becomes small.

The gain calculation unit 1243 multiplies the predetermined control gain to the position difference as mentioned above with reference to FIG. 4 again, and the larger the control gain is, the larger the force the drive unit 125 generates. Then, when the drive unit 125 generates large force, the large force is applied to the lens holding frame 113, which enlarges the deformation of the lens holding frame 113 as a result.

Accordingly, the gain adjustment unit 1243 changes (adjusts) the control gain according to the detection result of the second detection unit 114. For example, the gain adjustment unit 1243 decreases the control gain as the deformation that the information detected by the second detection unit 114 shows becomes larger. As a result of this, when the deformation becomes larger, the force that occurs by the drive unit 125 is reduced, which reduces the vibration that occurs in the lens holding frame 113.

Hereinafter, the control of the lens in the camera of the embodiment will be described as compared with control of a comparative example that does not have the second detection unit.

Figure 6A:
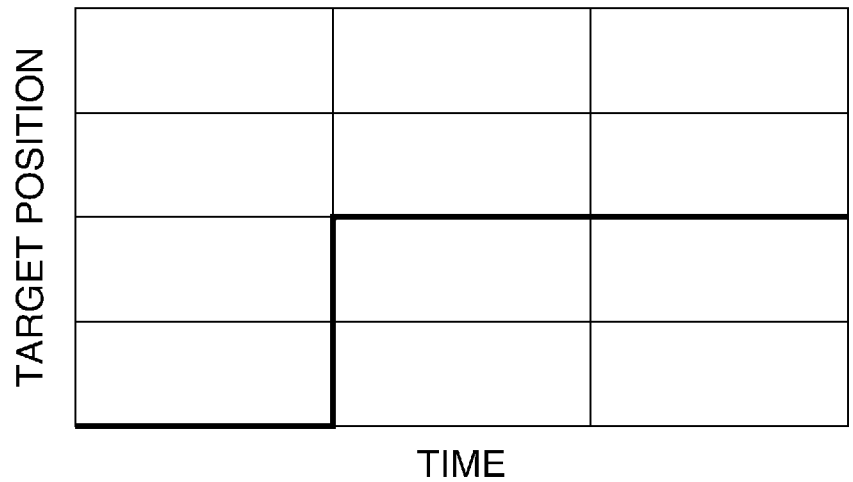
FIG. 6A, FIG. 6B, and FIG. 6C are graphs respectively showing variations of a target position, a lens holding frame position, and a lens center position that occur over time in lens movement control of a comparative example.
Figure 6B:
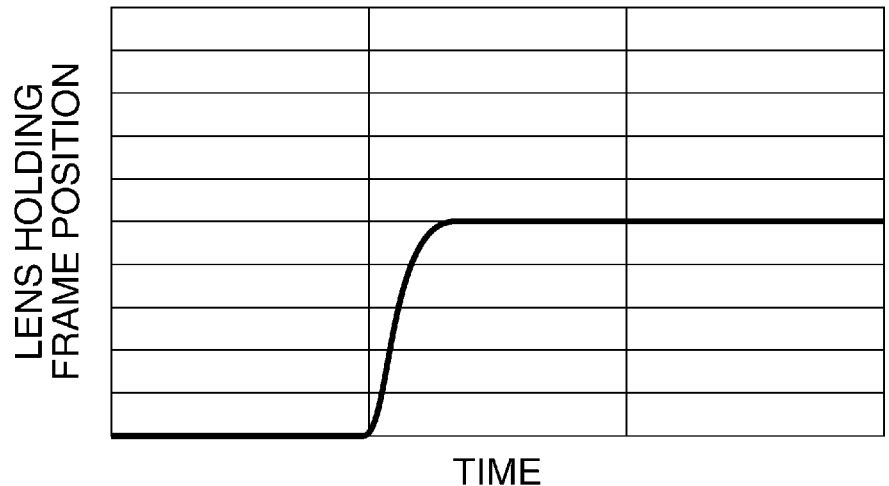
Figure 6C:
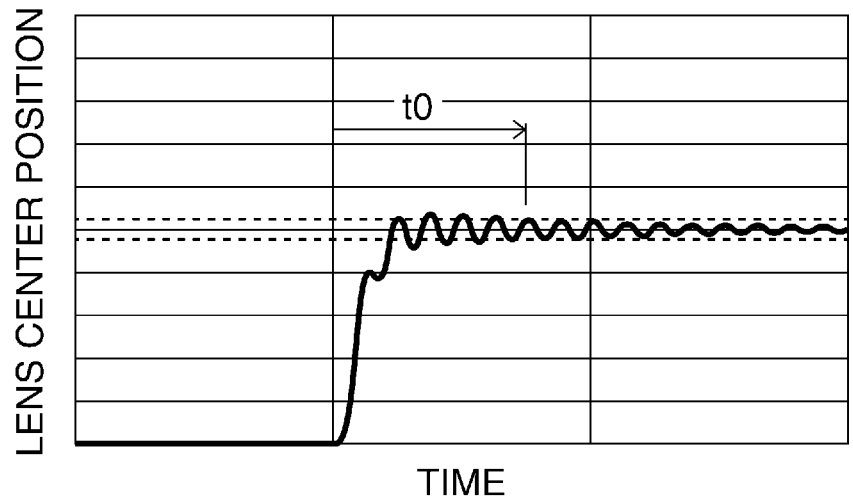

FIG. 6A, FIG. 6B, and FIG. 6C are graphs respectively showing variations of a target position, a lens holding frame position, and a lens center position that occur over time in lens movement control of the comparative example. It should be noted that the position in the description means a position in the description of the optical axis 111.

As shown in FIG. 6A, FIG. 6B, and FIG. 6C, the lens 112 starts moving at a timing when the target position varies in the comparative example. Then, when the detection result of the first detection unit 115a that shows the position of the lens holding frame 113 reaches the target position, the movement of the lens holding frame 113 stops as shown in FIG. 6B. In this case, the larger the difference between the target position and the position of the lens holding frame 113 is, the higher the control gain is. Accordingly, the closer the lens holding frame 113 to the target position is, the slower the speed for approaching to the target position is.

On the other hand, the force that occurs in the drive unit 125 when the lens moves causes the vibration at the center position of the lens 112 as shown in FIG. 6C. Then, the vibration concerned continues even after the lens holding frame 113 stops as shown in FIG. 6B. When the center of the lens 112 sufficiently approached the target position and the center position fell within a range defined by broken lines in FIG. 6C, it is determined that the lens 112 reached the target position. That is, the center position of the lens 112 continues vibration even after the lens holding frame 113 stops, and it is determined that the lens 112 reached the target position at last when a time period t0 elapses.

Figure 7A:
FIG. 7A, FIG. 7B, and FIG. 7C are graphs respectively showing variations of a target position, a lens holding frame position, and a lens center position that occur over time in lens movement control of the camera shown in FIG. 1.
Figure 7B:
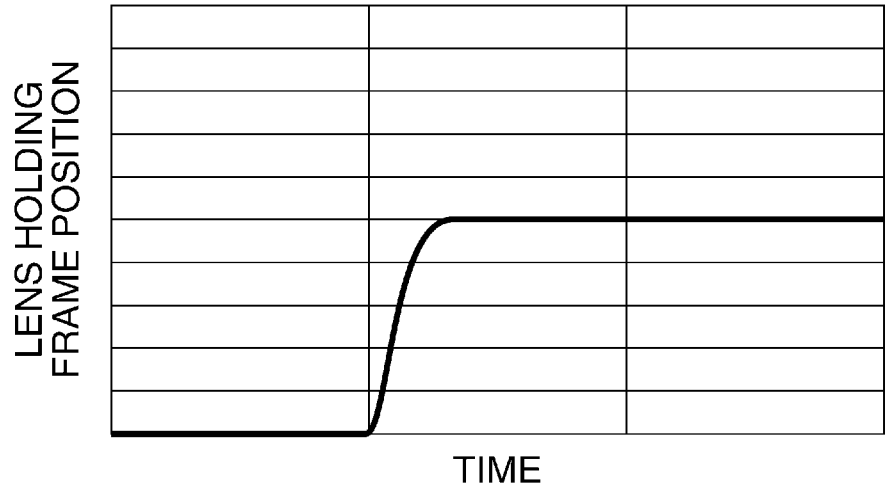
Figure 7C:
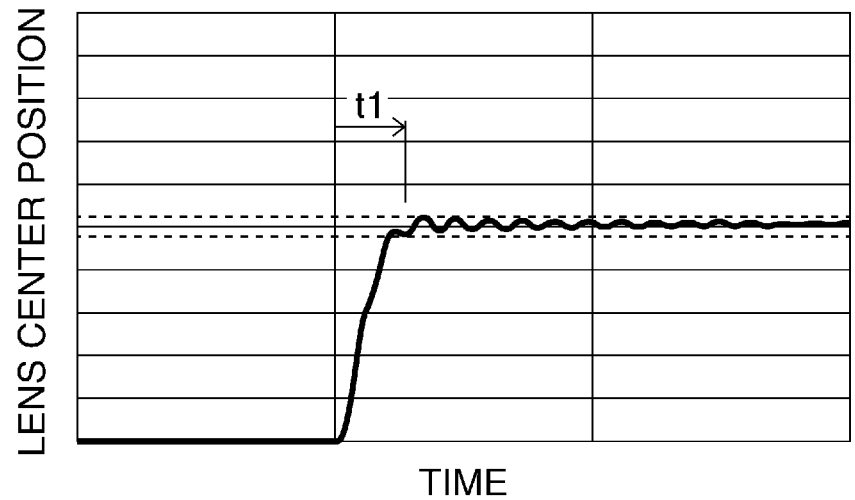

FIG. 7A, FIG. 7B, and FIG. 7C are graphs respectively showing variations of a target position, a lens holding frame position, and a lens center position that occur over time in lens movement control of the camera shown in FIG. 1.

As shown in FIG. 7A, FIG. 7B, and FIG. 7C, the lens 112 starts moving at a timing when the target position varies in the embodiment. Then, when the detection result of the first detection unit 115a that shows the position of the lens holding frame 113 reaches the target position, the movement of the lens holding frame 113 stops as shown in FIG. 7B. In this case, the smaller the control gain is, the larger the deformation that the detection result of the second detection unit 114 shows is as mentioned above. That is, the larger the displacement of the center position of the lens 112 from the lens holding frame 113 is, the smaller the control gain is. As a result, as shown in FIG. 7C, the vibration after the lens holding frame 111 stops decreases, and it is determined that the lens 112 reached the target position after a time period t1 elapses.

Since the time period t1 is less than the time period t0 on the basis of the comparison of FIG. 6C and FIG. 7C, the lens movement control of the camera shown in FIG. 1 shortens the time period needed for the AF as compared with the lens movement control of the comparative example. Thus, if the time period needed for the AF is shortened, the operation is accelerated when the AF is continuously performed. As a result, the responsiveness of the lens movement control is improved.

For example, if the high rigidity is required to the lens holding frame 113 so as not to cause the deformation, it is necessary to increase the volume using high-density material. This increases the mass of the lens holding frame 113 and lowers the responsiveness. That is, it is important not to increase the mass of the lens holding frame 113 as much as possible in order to improve the responsiveness. Accordingly, it is preferable to decrease the volume using low-density material. When the low-density material is used, the lens holding frame 113 may deform. However, when the defamation of the lens holding frame 113 is canceled as mentioned above, the lens 112 is moved to the target position with high accuracy in a short time.

Figure 8:
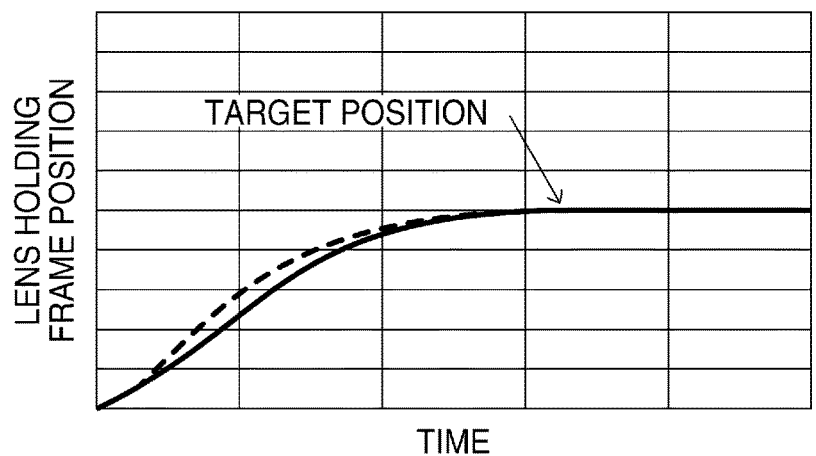
FIG. 8 is a graph showing variation of the position of the lens holding frame used in the camera shown in FIG. 1.

FIG. 8 is a graph showing variation of the position of the lens holding frame used in the camera shown in FIG. 1.

A broken line in FIG. 8 shows variation of the position of the lens holding frame 113 in the lens movement control of the above-mentioned comparative example. Then, a solid line shows variation of the position of the lens holding frame 113 in the lens movement control of the camera shown in FIG. 1. As illustrated, the moving speed of the lens holding frame 113 until reaching the target position is faster in the lens movement control of the comparative example. That is, the lens holding frame 113 approaches the target position more quickly in the lens movement control of the comparative example.

Since the deformation of the lens holding frame 113 occurs with the start of movement of the lens, the camera shown in FIG. 1 lowers the control gain according to the detection result of the second detection unit 114. As a result, the moving speed of the camera shown in FIG. 1 until reaching the target position lowers. On the other hand, the camera shown in FIG. 1 shortens the time period needed until the lens holding frame 113 stops at the target position by reducing the vibration as mentioned above.

When the moving speed of the lens 112 should be faster, the adjustment of the control gain according to the detection result of the second detection unit 114 may be stopped temporarily so as to control based on only the detection result of the first detection unit 115 in an initial period of the movement. For example, when a shutter speed is fast enough, the moving speed of the lens 112 should be faster. In this case, since an object is photographed in an instant when it is determined that the center position of the lens 112 reached the target position, there is no problem even if the vibration of the lens holding frame 113 does not stop.

As mentioned above, the second detection unit 114 detects the deformation of the lens holding frame 113. This enables to determine whether the center position of the lens 112 reached the target position even in the vibration state. As a result, the time period needed for the AF is shortened, and the responsiveness is improved.

Subsequently, an example of a camera equipped with a lens driving apparatus according to a second embodiment of the present invention will be described. It should be noted that a configuration of the camera according to the second embodiment is the same as that of the camera shown in FIG. 1 and that a configuration of the lens driving apparatus according to the second embodiment is the same as that of the lens driving apparatus shown in FIG. 2.

Figure 9:
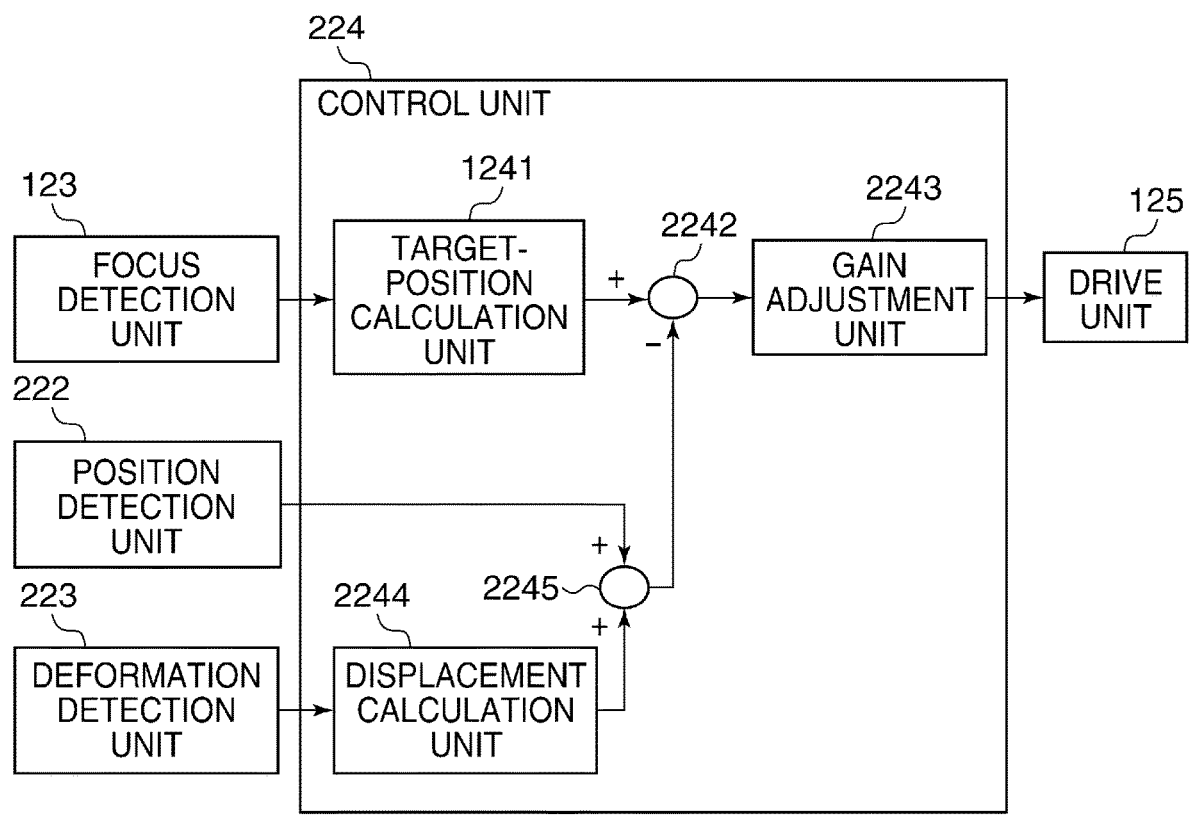
FIG. 9 is a block diagram showing an example of a functional block at the time of performing an AF process in a control unit of a camera according to a second embodiment of the present invention.

FIG. 9 is a block diagram showing an example of a functional block at the time of performing an AF process in a control unit of the camera according to the second embodiment of the present invention. It should be noted that a function of a control unit 224 shown in FIG. 9 differs from that of the control unit 124 shown in FIG. 4. Moreover, the first detection unit and the second detection unit are respectively shown as a position detection unit 222 and a deformation detection unit 223 in FIG. 9. Furthermore, components of the control unit in FIG. 9 that are the same as the components of the control unit in FIG. 4 are indicated by the same reference numbers and the descriptions thereof are omitted.

A displacement calculation unit 2244 multiplies a predetermined coefficient to a deformation amount that is an output of the deformation detection unit 223, and outputs displacement in the optical axis direction of the lens 112. It should be noted that the displacement in the optical axis direction is equivalent to the deviation amount E described with reference to FIG. 5. An adder 2245 adds a displacement that is an output of the displacement calculation unit 2244 to a current position that is an output of the position detection unit 222 to find a lens position.

Thus, the control unit 224 corrects the current position of the lens holding frame by the displacement of the lens holding frame, and obtains a corrected current position (corrected lens position).

A subtractor 2242 subtracts the corrected lens position that is the output of the adder 2245 from the target position, and outputs a position difference. Then, the position difference concerned is sent to a gain adjustment unit 2243. The gain adjustment unit 2243 generates a driving signal showing a driving amount by multiplying a predetermined control gain to the position difference, and outputs the driving signal to the drive unit 125.

As mentioned above, the center position of the lens 112 (lens position) in the direction of the optical axis 111 is found by adding the displacement of the lens 112 in the optical axis direction to the current position of the lens holding frame 113 in the second embodiment. Then, the control unit 224 subtracts the lens position from the target position, and controls so that the center of the lens 212 coincides with the target position. This enables to control the lens holding frame 113 so as to reduce the vibration even when the lens 112 itself vibrates.

Figure 10A:
FIG. 10A, FIG. 10B, and FIG. 10C are graphs respectively showing variations of a target position, a lens holding frame position, and a lens center position that occur over time in the lens movement control described in FIG. 9.
Figure 10B:
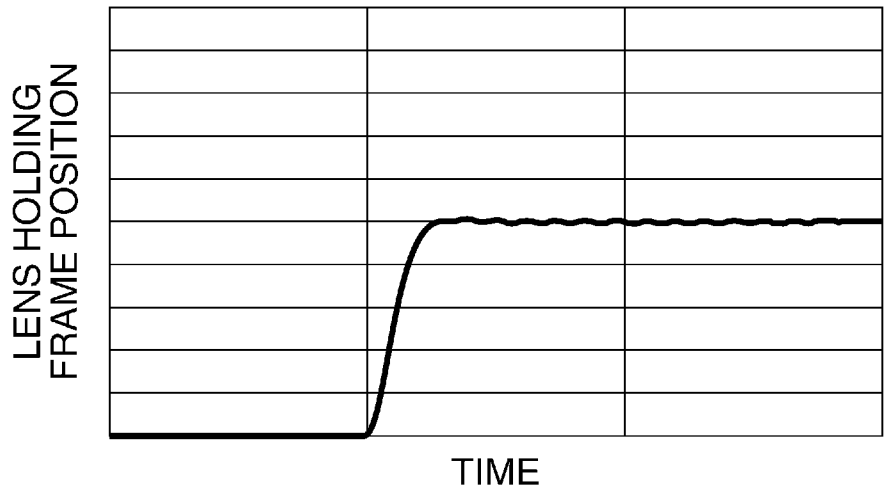
Figure 10C:
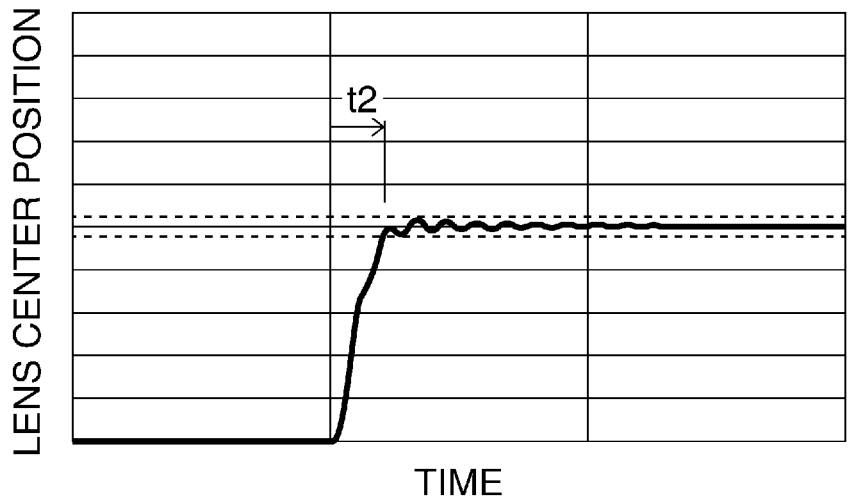

FIG. 10A, FIG. 10B, and FIG. 10C are graphs respectively showing variations of a target position, a lens holding frame position, and a lens center position that occur over time in the lens movement control described in FIG. 9.

As shown in FIG. 10A, FIG. 10B, and FIG. 10C, the lens 112 starts moving at a timing when the target position varies in the second embodiment. Then, when the detection result of the position detection unit 222 that shows the position of the lens holding frame 113 reaches the target position, the movement of the lens holding frame 113 stops as shown in FIG. 10B.

The lens movement control in the second embodiment controls so that the center of the lens 112 coincides with the target position as mentioned above. As a result, the vibration after the lens 112 stops decreases as shown in FIG. 10C. In this example, the center of the lens 112 reaches the target position when a time period t2 elapsed after the target position varies.

Since the time period t2 is less than the time period t0 on the basis of the comparison of FIG. 6C and FIG. 10C, the lens movement control of the second embodiment shortens the time period needed for the AF as compared with the lens movement control of the comparative example. Also in the second embodiment, the operation is accelerated when the AF is continuously performed. As a result, the responsiveness of the lens movement control is improved.

Subsequently, an example of a camera equipped with a lens driving apparatus according to a third embodiment of the present invention will be described. It should be noted that a configuration of the camera according to the third embodiment is the same as that of the camera shown in FIG. 1 and that a configuration of the lens driving apparatus according to the third embodiment is the same as that of the lens driving apparatus shown in FIG. 2.

Figure 11:
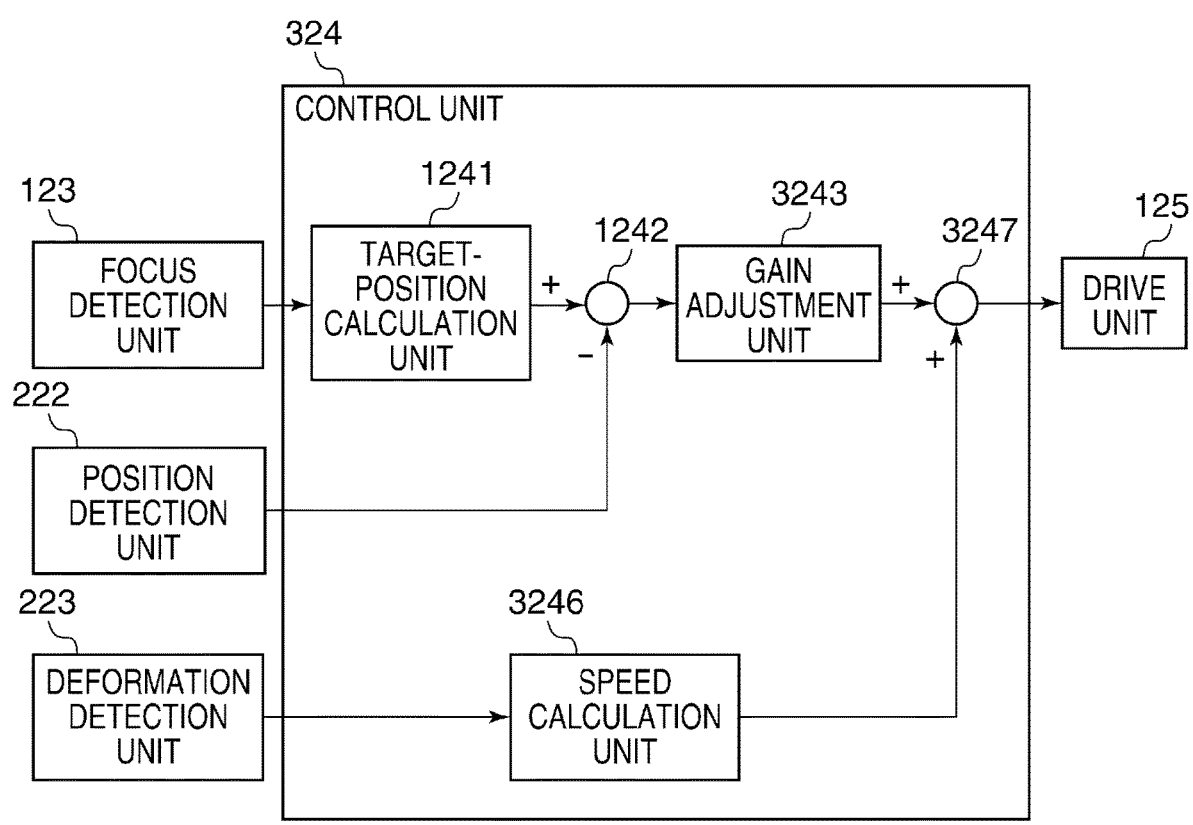
FIG. 11 is a block diagram showing an example of a functional block at the time of performing an AF process in a control unit of a camera according to a third embodiment of the present invention.

FIG. 11 is a block diagram showing an example of a functional block at the time of performing an AF process in a control unit of the camera according to the third embodiment of the present invention. It should be noted that a function of a control unit 324 shown in FIG. 11 differs from that of the control unit 124 shown in FIG. 4. Moreover, the first detection unit and the second detection unit are respectively shown as the position detection unit 222 and the deformation detection unit 223 in FIG. 11. Furthermore, components of the control unit in FIG. 11 that are the same as the components of the control unit in FIG. 4 are indicated by the same reference numbers and the descriptions thereof are omitted.

As described with reference to FIG. 4, the subtractor 1242 subtracts the current position from the target position, and outputs the position difference. Then, a gain adjustment unit 3243 outputs a control signal showing a control amount by multiplying a predetermined control gain to the position difference. On the other hand, the deformation amount that the output of the deformation detection unit 223 shows is input into a speed calculation unit 3246. The speed calculation unit 3246 finds a deformation speed on the basis of a time history of the deformation amount (i.e., a temporal variation). Then, the speed calculation unit 3246 sends an adder 3247 an adjusted deformation speed that is obtained by multiplying a predetermined coefficient to the deformation speed. The adder 3247 sends the drive unit 125 a driving signal that is obtained by adding the adjusted deformation speed to the control signal that is the output of the gain adjustment unit 3243.

In the third embodiment, the drive unit 125 is driven by considering the adjusted deformation speed that is obtained by multiplying the predetermined coefficient to the deformation speed obtained according to the temporal variation of the deformation amount. As a result, since the drive amount for the drive unit 125 increases with the deformation speed, high-frequency vibration is removed efficiently.

Although the defamation speed is added to the output of the gain adjustment unit 3243 in the example shown in FIG. 11, the gain adjustment unit 3243 may adjust the control gain according to the deformation speed. That is, although the control gain is changed according to the deformation amount in the above-mentioned first embodiment, the control gain may be changed according to the deformation speed in the third embodiment.

Figure 12A:
FIG. 12A, FIG. 12B, and FIG. 12C are graphs respectively showing variations of a target position, a lens holding frame position, and a lens center position that occur over time in lens movement control described in FIG. 11.
Figure 12B:
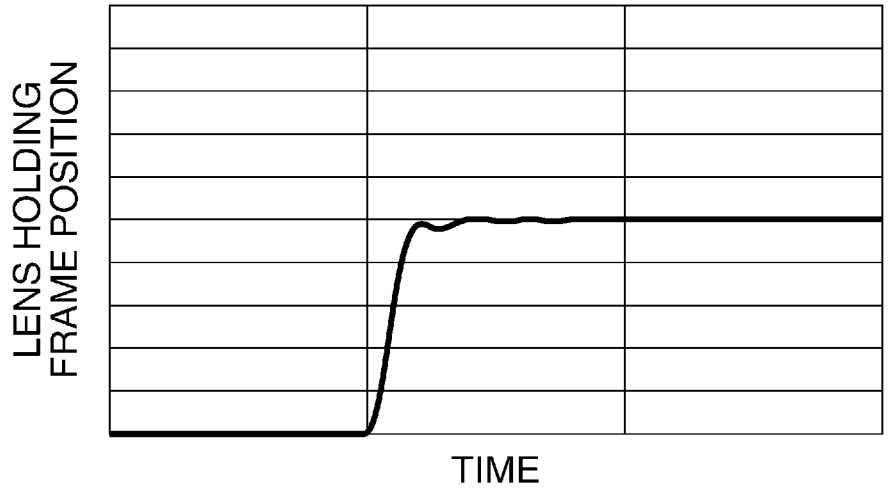
Figure 12C:
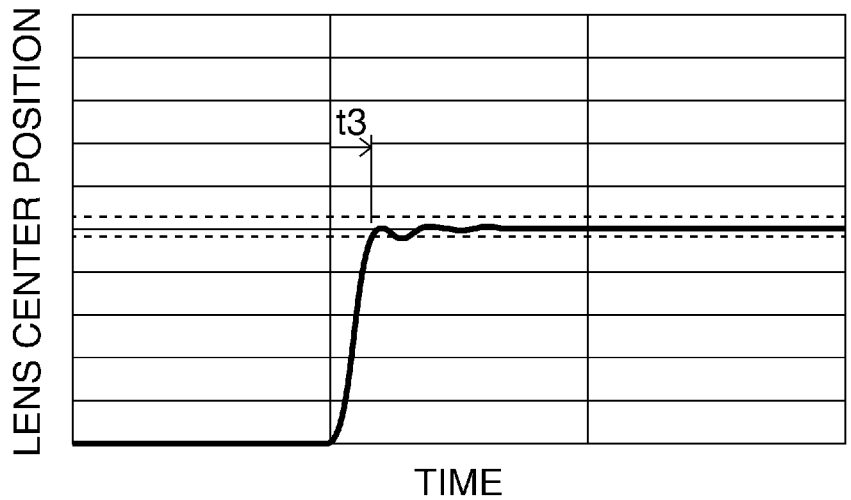

FIG. 12A, FIG. 12B, and FIG. 12C are graphs respectively showing variations of a target position, a lens holding frame position, and a lens center position that occur over time in lens movement control described in FIG. 11.

As shown in FIG. 12A, FIG. 12B, and FIG. 12C, the lens 112 starts moving at a timing when the target position varies in the third embodiment. Then, when the detection result of the position detection unit 222 that shows the position of the lens holding frame 113 reaches the target position, the movement of the lens holding frame 113 stops as shown in FIG. 12B.

In the lens movement control in the third embodiment, the drive unit 125 is driven by considering the deformation speed that is obtained according to the temporal variation of the deformation amount so that the center of the lens 112 coincides with the target position as mentioned above. As a result, the vibration after the lens 112 stops decreases as shown in FIG. 12C. In this example, the center of the lens 112 reaches the target position when a time period t3 elapsed after the target position varies.

Since the time period t3 is less than the time period t0 on the basis of the comparison of FIG. 6C and FIG. 12C, the lens movement control of the third embodiment shortens the time period needed for the AF as compared with the lens movement control of the comparative example. Also in the third embodiment, the operation is accelerated when the AF is continuously performed. As a result, the responsiveness of the lens movement control is improved.

Subsequently, an example of a camera equipped with a lens driving apparatus according to a fourth embodiment of the present invention will be described. It should be noted that the configuration of the camera of the fourth embodiment is the same as the camera shown in FIG. 1.

Figure 13A:
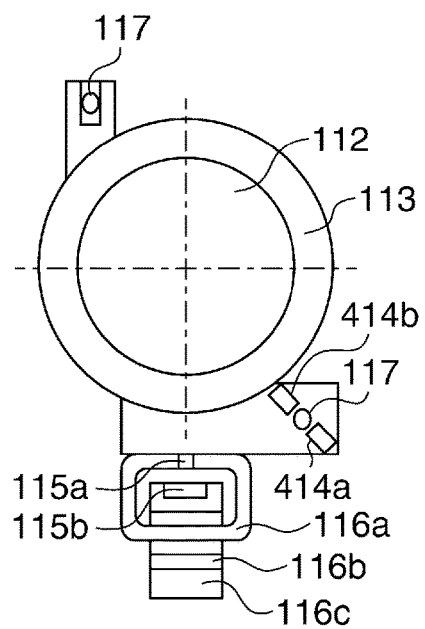
FIG. 13A and FIG. 13B are a front view and a side view of a lens driving apparatus according to a fourth embodiment of the present invention, respectively.
Figure 13B:
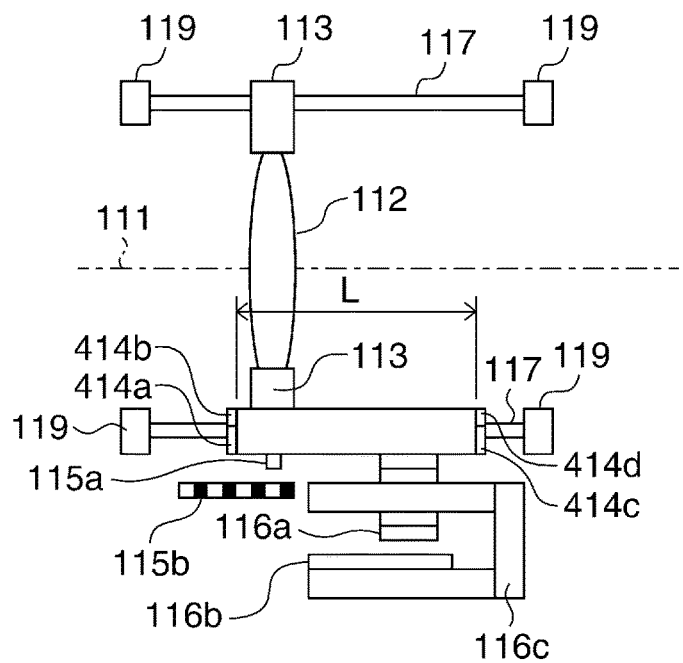

FIG. 13A and FIG. 13B are a front view and a side view of a lens driving apparatus according to the fourth embodiment of the present invention, respectively. It should be noted that components of the lens driving apparatus in FIG. 13A and FIG. 13B that are the same as the components of the lens driving apparatus in FIG. 2A and FIG. 2B are indicated by the same reference numbers and the descriptions thereof are omitted.

The second detection unit of the lens driving apparatus shown in FIG. 13A and FIG. 13B differs from that of the lens driving apparatus shown in FIG. 2A and FIG. 2B. Accordingly, the second detection unit consists of first, second, third, and fourth strain gauges 414a, 414b, 414c, and 414d as shown in FIG. 13B. As illustrated, the first, second, third, and fourth strain gauges 414a, 414b, 414c, and 414d are arranged at the both ends of the lens holding frame 113. The first and second strain gauges 414a and 414b are arranged at the left end of the lens holding frame 113, and the third and fourth strain gauges 414c and 414d are arranged at the right end of the lens holding frame 113 in FIG. 13B.

In the description, a length (fitting length) of the lens holding frame 113 in the optical axis direction shall be L. The guide part 117 is fit into the lens holding frame 113 by the length L in the direction of the optical axis 111. This reduces an inclination of the lens 112 with respect to the optical axis 111. On the other hand, it is necessary to form some gap (fitting backlash) between the lens holding frame 113 and the guide part 117 in order to guide the lens holding frame 113 smoothly by the guide part 117.

When the gap is formed in this way, the contact state between the lens holding frame 113 and the guide part 117 varies due to the gap concerned. Then, when the contact state varies, the lens 112 may incline with respect to the optical axis 111. In addition, the guide part 117 needs a length that the moving distance of the lens holding frame 113 is added to the length L at least. When the length L is increased in order to reduce the inclination of the lens 112, the guide part 117 becomes longer unescapably and the lens driving apparatus becomes large in the direction of the optical axis 111. Accordingly, miniaturization of the lens driving apparatus needs to shorten the length L. However, when the length L is shortened, the inclination of the lens 112 becomes larger and the center of the lens 112 may deviate in the direction of the optical axis 111.

As mentioned above, the illustrated lens driving apparatus has the four strain gauges 414a, 414b, 414c, and 414d as the second detection unit. The first and second strain gauges 414a and 414b are arranged on a line that connects the center of the lens 112 and the guide part 117 across the guide part 117. In the same manner, the third and fourth strain gauges 414c and 414d are arranged on the line that connects the center of the lens 112 and the guide part 117 across the guide part 117. Then, the control unit 124 determines the contact state between the lens holding frame 113 and the guide part 117 according to the detection results of the four strain gauges 414a, 414b, 414c, and 414d.

Figure 14A:
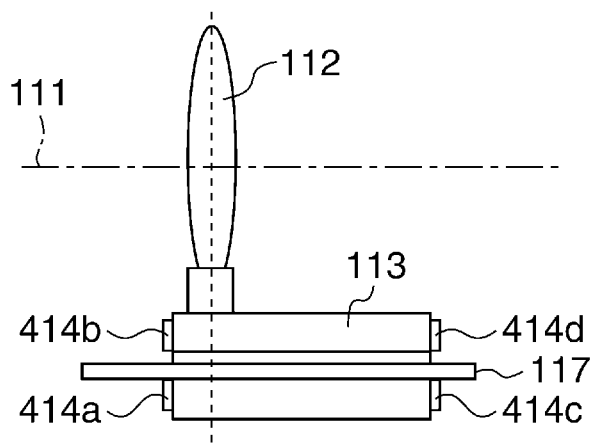
FIG. 14A and FIG. 14B are side views for describing detection of a contact state between the lens holding frame and a guide part in the lens driving apparatus shown in FIG. 13A and FIG. 13B.
Figure 14B:
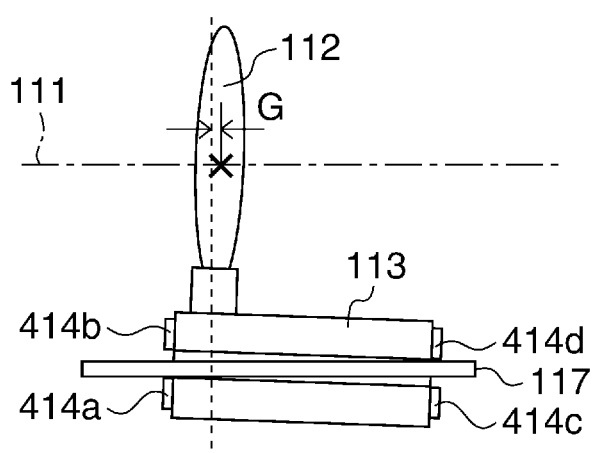

FIG. 14A and FIG. 14B are views for describing the detection of the contact state between the lens holding frame and the guide part in the lens driving apparatus shown in FIG. 13A and FIG. 13B. Then, FIG. 14A is a view showing a state where the lens is not inclining, and FIG. 14B is a view showing a state where the lens is inclining. It should be noted that FIG. 14A and FIG. 14B show a section of a part of the lens driving apparatus that passes the guide part 117 and the center of the lens 112.

In the state shown in FIG. 14A, force occurs due to the contact of the lens holding frame 113 and the guide part 117, which deforms the lens holding frame 113 slightly. Then, the deformation of the lens holding frame 113 is detected by the first and third strain gauges 414a and 414c. On the other hand, since the second and fourth strain gauges 414b and 414d are apart from the contact part of the lens holding frame 113 and guide part 117, they cannot detect deformation of the lens holding frame 113.

When the detection results are obtained from the first and third strain gauges 414a and 414c (i.e., when the deformation of the lens holding frame 113 is detected), the control unit 124 determines that the lens 112 is not inclining. Similarly, when the deformation of the lens holding frame 113 is detected by the second and fourth strain gauges 414b and 414d, the control unit 124 determines that the lens 112 is not inclining. In this case, the lens 112 does not deviate in the direction of the optical axis 111, and the center of the lens 112 is in a correct position.

In the state shown in FIG. 14B, the lens 112 inclines because the lens holding frame 113 contacts with the guide part 117 unevenly. In the state shown in FIG. 14B, since a portion of the lens holding frame 113 near the contact portion with the guide part 117 deforms, the detection results are obtained by the first and fourth strain gauges 414a and 414d. In this case, the lens 112 inclines, and the position of the center of the lens 112 deviates from the position in the state where there is no inclination by a deviation G. It should be noted that this deviation G is known beforehand on the basis of a design value and actual measurement at the time of assembly.

When the detection results are obtained by the second and third strain gauges 414b and 414c, the lens 112 inclines in the direction opposite to the state shown in FIG. 14B. In such a case, the deviation G occurs in the direction opposite to the direction shown in FIG. 14B.

When deformation occurs in a direction in which the strain gauges 414a, 414b, 414c, and 414d do not arranged, the deformation (i.e., inclination) cannot be detected in any of the strain gauges 414a, 414b, 414c, and 414d. In this case, the lens 112 inclines in the direction that intersects perpendicularly with the line that connects the center of the lens 112 and the guide part 117. Then, the inclination in the direction concerned affects the deviation of the center of the lens 112 in the optical axis direction slightly. Accordingly, the strain gauges 414a, 414b, 414c, and 414d are arranged at four positions as mentioned above in the fourth embodiment. However, the number of strain gauges may be increased in order to improve detection accuracy.

In the fourth embodiment, the control unit has the functional block shown in FIG. 9. The second detection unit that has the four strain gauges 414a, 414b, 414c, and 414d corresponds to the deformation detection unit 223. The detection results obtained by the strain gauges 414a, 414b, 414c, and 414d (i.e., the deformation detection unit 223) are sent to the displacement calculation unit 2244. The displacement calculation unit 2244 determines the state of the fitting backlash according to the detection results of the strain gauges 414a, 414b, 414c, and 414d. Then, the displacement calculation unit 2244 outputs the displacement in the optical axis direction corresponding to the deviation G. After that, the drive unit 125 is drivingly controlled as described in the second embodiment.

Thus, in the fourth embodiment of the present invention, the contact state (i.e., fitting backlash) of the guide part 117 and the lens holding frame 113 is detected, the deviation direction of the contact state is determined, and the drive unit 125 is controlled according to the deviation direction concerned. This enables to control the lens position with high accuracy by dealing with the deviation of the contact state that occurs during the movement of the lens and to improve the responsiveness of the lens movement control.

As is clear from the above description, at least the lens driving mechanism 110, focus detection unit 123, first detection unit 115a, second detection unit 114, control unit 124, and drive unit 125 constitute the lens driving apparatus in the example shown in FIG. 1.

Although the embodiments of the present invention have been described, the present invention is not limited to the above-mentioned embodiments, the present invention includes various modifications as long as the concept of the invention is not deviated.

For example, the functions of the above mentioned embodiments may be achieved as a control method that is executed by the lens driving apparatus. Moreover, the functions of the above mentioned embodiments may be achieved as a control program that is executed by a computer with which the lens driving apparatus is provided. It should be noted that the control program is recorded into a computer-readable storage medium, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-030844, filed Feb. 22, 2016, which is hereby incorporated by reference herein in its entirety.

What is claimed is:

1. A lens driving apparatus that drives a lens in an optical axis direction, the lens driving apparatus comprising:
    a guide comprising a guide rod extending in the optical axis direction;
    a holding frame that holds the lens and is supported by the guide rod movably in the optical axis direction;
    a first sensor configured to detect a position of said holding frame in the optical axis direction as a current position;
    a second sensor
        deposited on a surface of said holding frame, and
        configured to detect information about deformation of said holding frame, the information indicating a change of a positional relationship between the first sensor and the lens in the optical axis direction, the change being caused together with deformation of said holding frame; and
    at least one processor or circuit configured to:
        determine a target position of the lens in the optical axis direction;
        find a difference between the target position and the current position as a drive amount for driving said holding frame;
        obtain a corrected drive amount by correcting the drive amount based on the information about deformation, wherein the drive amount is corrected by adjusting control gain on a basis of the information about deformation and by multiplying the drive amount by the adjusted control gain; and
        control movement of said holding frame according to the corrected drive amount.

2. A lens driving apparatus that drives a lens in an optical axis direction, the lens driving apparatus comprising:
    a guide comprising a guide rod extending in the optical axis direction;
    a holding frame that holds the lens and is supported by the guide rod movably in the optical axis direction;
    a first sensor configured to detect a position of said holding frame in the optical axis direction as a current position;
    a second sensor
        deposited on a surface of said holding frame, and
        configured to detect information about deformation of said holding frame, the information indicating a change of a positional relationship between the first sensor and the lens in the optical axis direction, the change being caused together with deformation of said holding frame; and
    at least one processor or circuit configured to:
        determine a target position of the lens in the optical axis direction;
        find displacement of said holding frame in the optical axis direction according to the information about deformation; and
        control movement of said holding frame based on the target position and a corrected current position that is obtained by correcting the current position by the displacement.

3. A lens driving apparatus that drives a lens in an optical axis direction, the lens driving apparatus comprising:
    a guide comprising a guide rod extending in the optical axis direction;
    a holding frame that holds the lens and is supported by the guide rod movably in the optical axis direction;
    a first sensor configured to detect a position of said holding frame in the optical axis direction as a current position;
    a second sensor
        deposited on a surface of said holding frame, and
        configured to detect information about deformation of said holding frame, the information indicating a change of a positional relationship between the first sensor and the lens in the optical axis direction, the change being caused together with deformation of said holding frame; and
    at least one processor or circuit configured to:
        determine a target position of the lens in the optical axis direction;
        find speed of the deformation of said holding frame based on temporal variation of an amount of the deformation of said holding frame, obtained from the information about deformation;
        obtain a corrected drive amount by correcting a drive amount of said holding frame, which is obtained based on the target position and the current position, based on the deformation speed; and
        control movement of said holding frame according to the corrected drive amount.

4. The lens driving apparatus according to claim 1, wherein said first sensor is arranged on said holding member and detects a position of said holding member in the optical axis direction, and
    wherein said second sensor is arranged between the lens and said first sensor on said holding member.

5. The lens driving apparatus according to claim 1, wherein said holding member is movable along a guide part that is parallel to the optical axis, and
wherein said second sensor is installed in said holding member near the guide part.

6. A lens driving apparatus that drives a lens in an optical axis direction, the lens driving apparatus comprising:
a guide comprising a guide rod extending in the optical axis direction;
a holding frame that holds the lens and is supported by the guide rod movably in the optical axis direction;
a first sensor configured to detect a position of said holding frame in the optical axis direction as a current position;
a second sensor
deposited on a surface of said holding frame, and
configured to detect information about deformation of said holding frame, the information indicating a change of a positional relationship between the first sensor and the lens in the optical axis direction, the change being caused together with deformation of said holding frame; and
at least one processor or circuit configured to:
determine a target position of the lens in the optical axis direction; and
control movement of said holding frame based on the target position, the current position and the information about deformation,
wherein the second sensor is configured to measure strain or deformation of the surface of said holding frame to detect the information about deformation, the information indicating a deviation in position of the lens in the optical axis direction, the deviation being caused together with the deformation of the said holding frame.

7. An image pickup apparatus comprising:
a photographing optical system that includes a focusing lens; and
a lens driving apparatus that adjusts a focus by driving the focusing lens in an optical axis direction, the lens driving apparatus comprising:
a guide comprising a guide rod extending in the optical axis direction;
a holding frame that holds the focusing lens and is supported by the guide rod movably in the optical axis direction;
a first sensor configured to detect a position of said holding frame in the optical axis direction as a current position;
a second sensor
deposited on a surface of said holding frame, and
configured to detect information about deformation of said holding frame, the information indicating a change of a positional relationship between the first sensor and the lens in the optical axis direction, the change being caused together with deformation of said holding frame; and
at least one processor or circuit configured to:
determine a target position of the lens in the optical axis direction; and
control movement of said holding frame based on the target position, the current position and the information about deformation,
wherein the second sensor is configured to measure strain or deformation of the surface of said holding frame to detect the information about deformation, the information indicating a deviation in position of the lens in the optical axis direction, the deviation being caused together with the deformation of the said holding frame.

8. A control method for a lens driving apparatus having a guide comprising a guide rod extending in an optical axis direction, a holding frame that holds a lens and is supported by the guide rod movably in the optical axis direction, a first sensor, and a second sensor deposited on a surface of said holding frame, the control method comprising:
first detecting, by the first sensor, a position of the holding frame in the optical axis direction as a current position;
second detecting, by the second sensor, information about deformation of the holding frame, the information indicating a change of a positional relationship between the first sensor and the lens in the optical axis direction, the change being caused together with deformation of said holding frame;
determining a target position of the lens in the optical axis direction; and
controlling movement of the holding frame based on the target position, the current position and the information about deformation,
wherein the second detecting comprises measuring, by the second sensor, strain or deformation of the surface of said holding frame to detect the information about deformation, the information indicating a deviation in position of the lens in the optical axis direction, the deviation being caused together with the deformation of the said holding frame.

9. A non-transitory computer-readable storage medium storing a control program causing a computer to execute a control method for a lens driving apparatus having a guide comprising a guide rod extending in an optical axis direction, a holding frame that holds a lens and is supported by the guide rod movably in the optical axis direction, a first sensor, and a second sensor deposited on a surface of said holding frame, the control method comprising:
first detecting, by the first sensor, a position of the holding frame in the optical axis direction as a current position;
second detecting, by the second sensor, information about deformation of the holding frame, the information indicating a change of a positional relationship between the first sensor and the lens in the optical axis direction, the change being caused together with deformation of said holding frame;
determining a target position of the lens in the optical axis direction; and
controlling movement of the holding frame based on the target position, the current position and the information about deformation,
wherein the second detecting comprises measuring, by the second sensor, strain or deformation of the surface of said holding frame to detect the information about deformation, the information indicating a deviation in position of the lens in the optical axis direction, the deviation being caused together with the deformation of the said holding frame.

* * * * *